Figure 1:
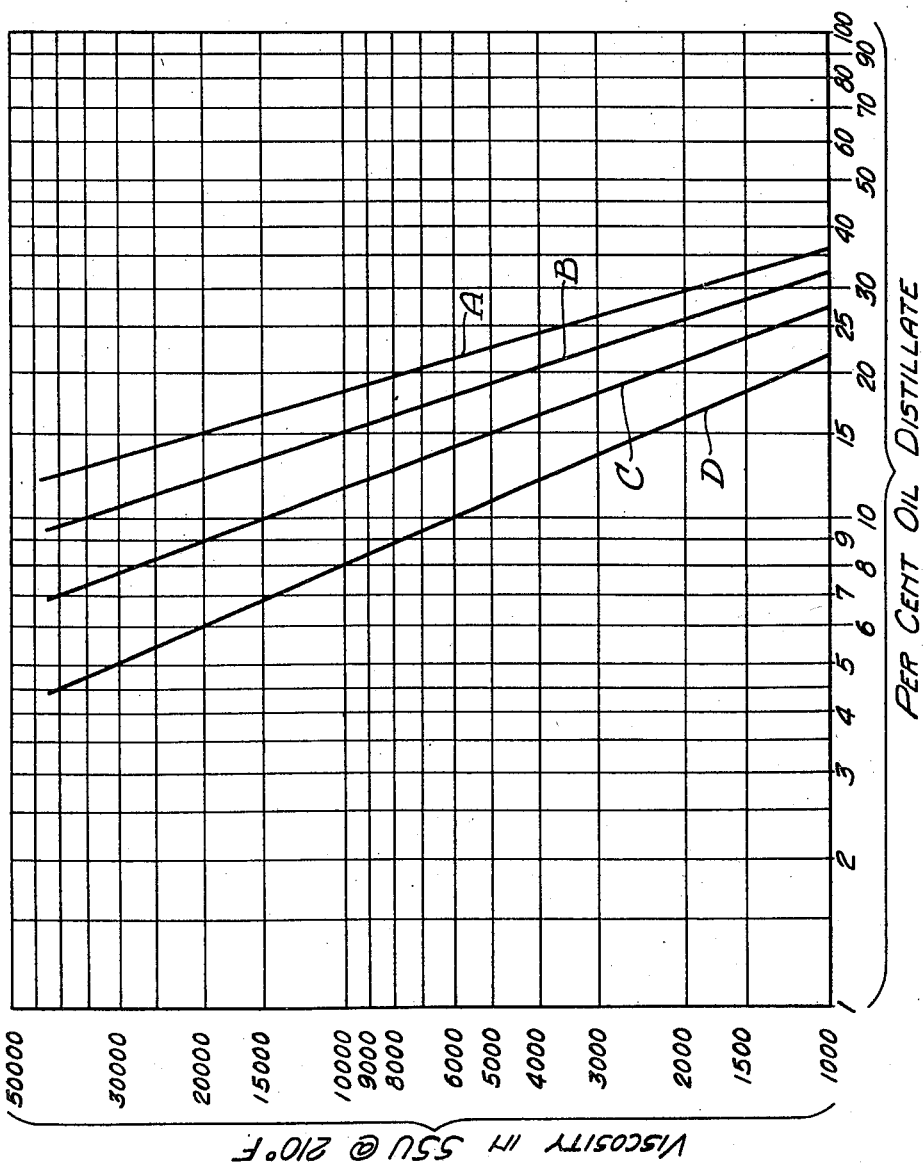

Feb. 17, 1948.  P. E. ROLLHAUS  2,436,332
RUBBER COMPOSITION
Filed Dec. 16, 1943

Inventor:
P. Edward Rollhaus
by his Attorney
Hugo A. Kemman

Patented Feb. 17, 1948

2,436,332

UNITED STATES PATENT OFFICE 2,436,332

RUBBER COMPOSITION

Philip Edward Rollhaus, Scarsdale, N. Y., assignor to The United Gas Improvement Company, a corporation of Pennsylvania Application December 16, 1943, Serial No. 514,490

17 Claims. (Cl. 260—28)

This invention relates to the use of certain tars in rubber compositions.

More particularly this invention relates to the use in rubber compositions of residual tar material separated from the products of the vapor phase pyrolysis of petroleum oil under conditions which minimize the polymerization of readily heat polymerizable monomeric unsaturated material boiling in the range of from approximately 200° C. to 350° C. and higher, and which effect the removal of relatively large proportions of distillate for a given viscosity of the residual tar.

Distillation methods for the separation of such residual tars from the light oil and dead oil also contained in tar-water emulsions produced in the vapor phase pyrolysis of petroleum are described and claimed in copending applications, Serial No. 342,735, filed June 27, 1940, by Edwin L. Hall and Howard R. Batchelder, which has matured into Patent 2,366,899, granted Jan. 9, 1945, and in an improvement thereto, Serial No. 401,966, filed December 1, 1941, by Horace M. Weir, which has matured into Patent 2,366,900, granted Jan. 9, 1945.

The novel residual tars produced in the process of said copending applications and polymers thereof are particularly described and claimed in copending application Serial No. 514,488, filed Dec. 16, 1943, by Edwin L. Hall and Howard R. Batchelder, which has matured into Patent No. 2,423,424, granted July 1, 1947. As described in the said application such residual tar is separated from the condensate from pyrolysis products formed during the production of combustible gas by processes involving the pyrolytic decomposition of hydrocarbon oil.

In such processes petroleum oil is pyrolyzed in vapor phase and at reduced partial pressures due to the presence of diluent gas such as blue water gas and/or steam and at relatively high temperatures such as 1300° F. average set temperature and above as measured by standard type shielded thermocouples.

In such processes the gas leaving the gas-making apparatus is usually brought into contact with water such as in the wash-box, and as a result the tar which separates from the gas is usually recovered in the form of an emulsion with water. Thus the tar emulsion in extreme cases may contain as high as 95% water or even higher. In some cases the tar emulsion may be in the form of a pasty solid of very high viscosity. As a rule, the tar emulsion will contain at least 50% water and in this respect differs from tars obtained in processes for the production of coal gas or coke oven gas, or in many oil cracking processes for the production of motor fuel, for in the latter processes the tar as recovered is not in an emulsion form.

The residual tar described and claimed in said third mentioned copending application differs markedly from residual tars separated by conventional methods in which heat polymerization is not avoided and in which less distillate is separated for any given tar viscosity.

In the separation of residual tar from the distillate such as light oil boiling up to approximately 200° C. and dead oil boiling from approximately 200° C. to 350° C. and higher, the viscosity of the residual tar is affected by two factors (1) the quantity of relatively fluid oil left in the residual tar and (2) the degree of polymerization of heat polymerizable unsaturates to more viscous polymers. By avoiding polymerization in the separation, increased yields of distillate may be secured for any given residual tar viscosity and residual tar may be recovered which for its viscosity not only contains an unusually small proportion of distillable oil, but which for its viscosity-distillable oil content relationship has an unusually large content of unsaturated heat polymerizable monomeric material.

After separation of the distillate, this heat polymerizable content in the residual tar may be polymerized, the resulting polymer not containing polymers of the high boiling heat polymerizable material separated with the dead oil.

The greater the extent to which the polymerization of the unsaturated readily heat polymerizable material boiling above 210° C. is avoided in the separation, the lower the quantity of oily material that may be present in the residual tar of a given viscosity, and the greater the heat polymerizable content that may be present in the residual tar of a given viscosity.

After the separation, if the melting point of the tar is to be raised by polymerization of the heat polymerizable material contained therein, it is not so important to avoid its polymerization in the separation apparatus except that handling difficulties increase with increase in viscosity of the residual tar.

Other processes of separation of light oil and dead oil from the pitch constituents of residual tar, which avoid polymerization of these high boiling heat polymerizable materials prior to their separation from the residual tar, may be employed in the production of novel residual tar of the character described.

I have found that the use of residual tar of the character described and/or polymerization products thereof is particularly advantageous in rubber compositions.

The residual tar employed in my invention will be further described in connection with the drawing in which the figure is a graph showing relationships between residual tar viscosity and its content of distillable oily material.

Referring to the figure:

In this figure, curves A, B, C and D show relationships between (1) the viscosity of the residual tar, when measured in SSU @ 210° F. (seconds Saybolt Universal @ 210° F.), and (2) its content of distillable oil, as measured by the quantity of oil recoverable from the residual tar, when it is distilled under an absolute pressure of 11 mm. Hg to an end vapor temperature of 180° C., expressed in percent by weight of the original residual tar.

The curves are illustrated as plotted on a log log chart with the viscosity in SSU @ 210° F. plotted as the ordinate and the percent by weight of oil distillate as above defined plotted as the abscissa.

The region to the left of curve A embraces viscosity-oil distillate relationships of residual tar the use of which or of products of the further polymerization of which is contemplated in the present invention. As one moves to the left progressively from curve A to curves B, C, and D one progressively enters more preferred regions of diminished distillate content for a given viscosity.

The formula for curve A is log $y = 8.29 - 3.39 \log x$.

The formula for curve B is log $y = 7.57 - 3.03 \log x$.

The formula for curve C is log $y = 6.85 - 2.67 \log x$.

The formula for curve D is log $y = 6.05 - 2.26 \log x$.

The residual tars of said third mentioned copending application as separated from the light oil and dead oil, are characterized by a relatively high content of heat polymerizable hydrocarbon material for their viscosity-oil distillate relationship and are unique in this respect.

For the purposes of said third mentioned copending application the unsaturated heat polymerizable content of the residual tar is measured by the increase in the melting point of the residual tar, when the residual tar is heated for 12 hours at 180° C. under conditions of total reflux.

All melting points recited in this application are to be considered as determined by the A. S. T. M. Ball and Ring Method of A. S. T. M. Standard D-36-26.

Under these conditions increases in melting point from 20° C. and less to 50° C. and more may be secured depending upon the degree to which polymerization has been avoided in the separation of particular residual tar measured.

The melting point of the residual tars increases with viscosity, for example, a melting point of approximately 25° C. has been noted associated with a viscosity of 800 SSU @ 210° F., melting points in the range of approximately 40° C. to 50° C. associated with viscosities of the order of 3750 SSU @ 210° F. and melting points of the order of 55° C. associated with viscosities of the order of 7500 SSU @ 210° F.

It will be readily understood by those skilled in the art that the precise quantity of heat polymerizable material associated with a given viscosity-oil distillate relationship at the time of separation of the residual tar from the light oil and dead oil may be varied considerably depending upon the degree to which polymerization has been avoided in the separation process and that residual tars over a wide range of viscosities may be separated from the dead oil and light oil.

It will be understood that residual tars of very high viscosities may be separated from the dead oil and light oil, even up to viscosities as high as 30,000 SSU @ 210° F. and more, but due, among other things, to much greater ease of handling it is preferred to separate residual tars having viscosities not exceeding 20,000 SSU @ 210° F. and more preferably not exceeding 10,000 SSU @ 210° F.

Because very low viscosities are associated with only partial separation of dead oil constituents it is preferred to separate residual tars of viscosities of at least 1500 SSU @ 210° F. and better yet 2000 SSU @ 210° F. The range of viscosities between 3000 SSU @ 210° F. and 10,000 SSU @ 210 F. is most preferred, not only because of ease of handling, but because of other characteristics of the separated tar.

Inasmuch as a high content of heat polymerizable unsaturation as measured above, permits the separation of a residual tar of relatively low viscosity and hence one which may be handled with ease, while still permitting the production of a high melting product by polymerization, residual tars containing a sufficient heat polymerizable unsaturation to cause an increase in melting point on polymerization of from at least 30° C. are more preferred, while those capable of an increase in melting point of at least 40° C. or at least 50° C. are especially desirable.

In other words it is preferred, other conditions being the same, for any given desired melting point to separate the residual tar at as low a viscosity as possible and still be able to attain the desired melting point in the desired manner.

Particularly desirable residual tars may be recovered in the application of the separation process of copending application Serial No. 342,735 to tars produced in the vapor phase pyrolysis, under conditions of "uniform and homogeneous" cracking, of petroleum oil which may be characterized as naphthenic by the method of classification set forth in Bureau of Mines Report of Investigations 3279, and with a depth of cracking measured by a "residual oil gas" production between 40 and 80 cubic feet per gallon of oil pyrolyzed and particularly between 45 and 65 cubic feet per gallon of oil pyrolyzed. Oils which may be classified in Bureau of Mines classes 5 to 7 are particularly desirable as source materials, with class 7 most preferred.

By "residual oil gas" is meant the uncondensed final gas after removal of substantially all water vapor or after correction for the presence of water vapor, and after the removal of substantially all hydrogen sulfide or after the correction for the presence of hydrogen sulfide (unless the oil is low in sulfur content in which case the hydrogen sulfide is negligible for calculation of residual oil gas), and after removal of substantially all hydrocarbons having more than three carbon atoms, or after correction for the presence of such hydrocarbons having more than three carbon atoms, and after correction for the presence of gas not derived from the oil cracked such as air and combustion gases from fuel used for heating, and after correction for any water gas which may be present.

By homogeneous cracking it is intended to embrace conditions such, for instance, as concentration of oil vapors, space velocity, turbulence, surface-volume relationships or the interior of the cracking vessel or vessels and character of heated surfaces which are such that in any given plane normal to the flow of materials, the materials throughout the plane have previously had substantially the same opportunity to be heated and to undergo the alternate decompositions and synthesis which comprise cracking and which progress toward products of greater thermal stability under the environment obtaining.

Other conditions being fixed, variation of any one of the following factors in the direction cited is considered to tend toward less homogeneity in the cracking operation; (1) decreased surface/volume ratio of the cracking vessels beyond the vaporizing zone; (2) reduced atomization of the oil; (3) increased impingement of oil on highly heated surfaces prior to vaporization; (4) increased concentration of the oil vapors; (5) decreased turbulence; and (6) increased space velocity except as effecting turbulence.

In addition to relative homogeneity of cracking which as defined would permit wide changes in cracking conditions during a cycle, it is preferred that the cracking conditions also be what is termed herein "relatively uniform" during the cycle.

In a cyclic operation in which oil cracking chambers are heated during a heating period and the stored heat utilized during the cracking period, the quantity of oil gas produced (and the yields of the desired products) per gallon of oil during any individual oil-cracking run will vary somewhat as the temperature of the cracking chambers decreases during said run. The degree of variation will depend among other factors, upon the length of the oil-cracking run, the oil and steam input rates, the presence or absence of supplementary heating during the run, the quantity of heat stored during the heating period and the character of the heat storage material.

Very large swings in oil gas production during a cycle are not preferred as any swing in oil gas production during a cycle necessitates a departure from the optimum conditions within the range of the swing and makes the cracking less uniform over the cycle.

In cyclic operation, other conditions being equal, swings in oil gas production during the cycle may be reduced by reducing temperature swings during the cycle which is favored by use of a relatively short cycle and/or by the employment of highly conductive heat storage material.

Therefore, the environment of oil pyrolysis hereunder is advantageously arranged to provide not only relatively homogeneous cracking but also relatively uniform cracking.

A convenient measure of the homogeneity and uniformity of the cracking operation is the relation between the sulfonation residue and the free carbon in the condensate from the gas, as will hereinafter appear.

Sulfonation residue is a measure of the normally non-gaseous paraffines and naphthenes surviving the cracking operation, and hence, high sulfonation residue is an indication of light cracking. Free carbon, on the other hand, is an end product in the pyrolysis of hydrocarbons, and hence, high free carbon indicates severe cracking.

High sulfonation residue together with high free carbon indicates that both light and severe cracking have taken place during the cycle and, hence, is an indication either of great lack of homogeneity of cracking, or of great lack of uniformity of cracking, or both.

Methods for the determination of "residual oil gas" and "uniformity and homogeneity" of cracking are described in copending application Serial No. 372,074, filed December 28, 1940, by Newcomb K. Chaney and Edwin L. Hall, which has matured into Patent 2,383,772, granted Aug. 28, 1945.

Residual tars thus separated from such pyrolysis products in addition to the characterizations previously set forth, may be characterized by certain specific properties of the oil which they contain which is distillable under the conditions previously defined.

Among such properties the following may be mentioned. Mixed aniline point as measured by A. S. T. M. Tentative Standard D 611–41T 4.0 to 14.0° C. Specific gravity in the range from 1.00 to 1.02 inclusive. Refractive index 20/D in the range from 1.593 to 1.62 inclusive. Refractivity intercept in the range from 1.09 to 1.11 inclusive.

For certain purposes residual tars containing oil with lower mixed aniline points such as in the range from 4 to 10 inclusive or 4 to 8 inclusive are especially preferred, such residual tars being highly aromatic and the oil having high solvent power.

It is not intended to limit the invention to residual tars from the pyrolysis of naphthenic oils and residual tar having distillable oil of widely differing characteristics from those set forth above is not excluded from its scope. Residual tars with distillable oil of higher aniline point may be particularly desirable for certain uses.

However, residual tars separated as previously set forth from the preferred pyrolysis products of naphthenic petroleum oils are particularly valuable.

The following are examples of the determination of the distillable oil content of residual tars as previously defined and show residual tars having viscosity-oil distillate relationships within the area defined by the curves.

EXAMPLE 1

A sample of residual tar separated by the process of copending application Serial No. 342,735 from the products of the vapor phase pyrolysis of a naphthenic oil of class 7 according to the before mentioned Bureau of Mines classification and pyrolyzed under conditions of relatively uniform and homogeneous cracking as before defined and with a "residual oil gas" production within the preferred range before set forth was found to have a viscosity of 10670 SSU @ 210° F.

The sample was distilled under a pressure of 11 mm. Hg absolute to an end vapor temperature of 180° C. The yield of distillate was found to be 8% by weight of the sample.

EXAMPLE 2

A sample of residual tar separated by the process of copending application Serial No. 342,735 from the products of the vapor phase pyrolysis of the same type of oil as in Example 1 and the same general conditions of pyrolysis was found to have a viscosity of 4020 SSU @ 210° F. The sample was distilled under a pressure of 11 mm. Hg absolute to an end vapor temperature of 180° C. The yield of distillate was found to be 12% by weight of the sample.

Innumerable other examples might be given. At very high viscosities for example, those above 20,000 SSU @ 210° F., the content of distillable oil under the conditions set forth is low and very considerable care must be exercised in its proper determination.

In addition to the previously recited characteristics of viscosity-distillable oil relationship and heat polymerizable content, residual tars employed herein may have other properties which will be described hereinafter.

Recognized extraction techniques have been developed for the analysis of bituminous materials such as those described in Research Paper RP1387, Journal of Research of the National Bureau of Standards, volume 26, May 1941, page 415, and the technique of Marcusson as described by Abrams in "Asphalts and Allied Substances," 4th edition. These publications give the names "asphaltenes," "carbenes," "carboids," "asphaltic resin" and "liquid oily constituents" to materials extracted, precipitated, polymerized, etc. by the procedures therein set forth.

In said third mentioned copending application this nomenclature has been adopted for convenience to define the materials separated from their residual tar by the same techniques. It is stated, however, that this adoption of these names does not mean that the materials so separated are at all identical with materials so separated from other bituminous substances, and that as a matter of fact the so-called "asphaltenes" and "asphaltic resins" particularly, as produced from residual tar of the character described, by the separation technique employed, have properties which differ markedly from the properties of "asphaltenes" and "asphaltic resin" produced by the same technique from other bituminous materials.

It is also stated in said third mentioned copending application that specific proportions of "asphaltenes," "carbenes," "carboids," "asphaltic resin," and "liquid oil constituents" as may be mentioned therein refer to proportions as determined by the specific techniques referred to and not to absolute proportions.

Employing the nomenclature adopted in said third mentioned copending application and with the same qualifications as to the precise character of the "asphaltenes," "carbenes," "carboids," "asphaltic resin" and "liquid oil constituents" and their absolute proportions, the following definitions are made for convenience in describing the additional properties which the residual tars and polymers thereof may have.

"Asphaltenes" are the portion of the residual tar insoluble in pentane and soluble in CCl₄. "Carbenes" are the portion of the residual tar insoluble in pentane and insoluble in CCl₄. "Free carbon" or "carboids" are the portion of the residual tar insoluble in pentane, CCl₄ or in benzene.

Of the portion of the residual tar which is soluble in pentane, "asphaltic resin" is the portion which is polymerized by the action of fuller's earth, the resulting polymer being soluble in ether, while "liquid oily constituents" are the portion of the pentane soluble material which is unpolymerized by the action of fuller's earth and is soluble in ether. The term "liquid oily constituents" is not to be confused with the oil, which is distillable from the residual tar under the conditions previously set forth.

The determinations of the "asphaltenes," "asphaltic resins" and "liquid oily constituents" are by the methods set forth in Research Paper RP1387—Journal of Research of the National Bureau of Standards, volume 26, May 1941, page 415.

The determinations of "carbenes" and "carboids" are by the method of Marcusson as set forth by Abrams in "Asphalts and Allied Substances," 4th edition, except that the carbenes and carboids are determined on the material insoluble in pentane instead of the material insoluble in petroleum naphtha as in Abrams.

Preferably in the residual tars employed the content of "free carbon" or "carboids" does not exceed 25%, and more preferably does not exceed 15%, and still more preferably does not exceed 10% by weight of the total material insoluble in pentane.

Furthermore, the total content of "asphaltenes" or material which is soluble in CCl₄ and insoluble in pentane is preferably at least 70% of the total material insoluble in pentane. For some uses it is also preferable that the "carbenes" shall not total more than 20%, and more preferably not more than 10% of the total material insoluble in pentane, and that the "asphaltic resin" does not exceed more than 6% of the residual tar.

The residual tars of the character described may be polymerized by heat to form valuable polymeric products of higher melting point, which for convenience in description will be referred to generally as "residual tar polymer." A wide range of polymerization temperatures and times may be employed, temperatures from 120 to 220° C. and times of 4 to 24 hours may be mentioned as examples.

The following table shows the melting point of the residual tar polymer produced from several residual tars after heat polymerization under conditions of total reflux at 150° C. for various lengths of time.

*Table 1*

| Residual Tar | | Residual Tar Polymer, Melting Point ASTM Ball and Ring After heating for— | | |
|---|---|---|---|---|
| Viscosity SSU @ 210° F. | Melting Point ASTM Ball and Ring, °C. | 3 hrs. | 6 hrs. | 13 hrs. |
| 1,130 | 30.2 | 54.5 | 63.8 | 72.5 |
| 3,760 | 40.8 | 63.5 | 72.7 | 80.0 |
| 3,760 | 51.2 | 71.5 | 80.3 | 90.5 |

Many other examples of such residual tar polymer might be given with higher and lower melting points. Melting points exceeding 100° C. may be attained in the production of residual tar polymer from residual tars of relatively high viscosity of the character described.

The melting point of residual tar polymer may be further raised by a combined heat polymerization and distilling operation, by means of which not only is an increase in melting point due to polymerization effected but a further increase due to the removal of associated oil. An example of such procedure is the heating of the residual tar for 12 hours at 200° C. while simultaneously passing stripping steam through the hot tar. By such procedure melting points of well over 100° C. may be readily attained.

Residual tar polymer of the character described may have characteristics as to "asphaltene" and "carboid" content which fall within the ranges previously set forth in connection with the description of the residual tar.

The residual tar and residual tar polymers of the character described are usually black materials when viewed as thick masses by reflected light. When viewed as thin films by transmitted light, they are generally reddish. The residual tar polymers of high melting point, such as those of melting point above 80° C., more particularly those of melting point above 90° C., and most especially those of melting point above 100° C. are relatively dry, solid materials which are capable of being readily crushed and powdered.

Residual tars and residual tar polymers of the character described prior to subsequent treatment or modification to which they may be subjected, are substantially hydrocarbon in nature, and largely free from oxygenated compounds and nitrogen compounds. Even after being blown with air at relatively elevated temperature, their oxygen content is low compared with many unblown bituminous materials.

Residual tar material of the character described having a very wide variety of melting points may be employed. For use in some rubber compositions, material of a low melting point may be particularly preferred, while in others the most desirable material is that having a relatively high melting point. Melting points over a range of from 30° C. to 100° C. and more are mentioned as examples.

Residual tars and polymers of the kind described are particularly desirable for use as plasticizers in formulations with synthetic rubbers or elastomers of many kinds especially those produced by the polymerization of diolefines and/or by the copolymerization of diolefines with each other and/or with other polymerizable material. Examples are polymers of butadiene, isoprene, piperylene and 2-chlorobutadiene, either alone or as copolymers with each other and/or with other materials such as olefines, unsaturated nitriles, acids, esters, ethers, ketones, aldehydes, and substituents thereof, such as styrene, acrylic nitrile, isobutylenes, acrylic esters, and the like.

Important examples of synthetic rubbers or elastomers are those obtained by the copolymerization of one or more diolefines with (1) styrene or substituents thereof, (2) acrylic nitrile, and/or (3) isobutylene or similar olefines.

Certain of the above materials are known in the art under different trade names, such as for example, as Buna, Buna S, Buna N, Chloroprene, neoprene, Ameripol, Hycar, butyl rubber and the like. GR-S is the name given to U. S. Government rubber produced by copolymerizing butadiene and styrene.

In synthetic rubber formulations for certain purposes it is advantageous to employ as plasticizers residual tars and/or residual tar polymers of relatively low melting points, such as below 60° C. In other formulations and/or for other uses it is advantageous to employ residual tars and/or residual tar polymers of higher melting point such as those having melting points of at least 60° C., at least 75° C., at least 80° C., or at least 90° C. or 100° C.

I have found that residual tar and residual tar polymer of the character described may be incorporated directly into rubber compositions by the usual method used for incorporating a plasticizer, such as for example, the use of a Banbury mixer. This material acts as a plasticizer to produce compositions possessing exceptionally good properties. It also imparts a certain degree of hardness to rubber compositions characteristic of the carbon black usually employed for this purpose and to this extent may be a substitute for carbon black in addition to being a plasticizer.

When compounding rubber in the usual manner it is difficult to incorporate carbon black into the composition directly, by use of the Banbury mixer for example, without the use of some liquid solvent or plasticizer. I have found that this residual material, when incorporated into the rubber composition, permits the easy addition of carbon black in the Banbury mixer without the necessity of a solvent and increases the ease of extrusion of the rubber. Even when this residual tar material is in the form of a solid powder, it acts as a true plasticizer.

The quantity of residual material of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

A wide range of ingredients may be employed in natural and/or synthetic rubber formulations, in which the residual tar or residual tar polymer above described is incorporated, in addition to vulcanizing agents and/or accelerators such as, for example, sulfur or sulfur-containing compounds such as tetramethyl-thiuram disulfide, mercaptoarylenethiazoles, and dithio carbamates. Of such other ingredients the following are given for example, metallic oxides, such as, for example, magnesium oxide, zinc oxide, and lead oxide; antioxidants, such as, for example, phenyl-alpha-naphthylamine (Neozone A), and phenyl-beta-naphthylamine (Neozone D); reinforcing pigments, such as, for example, carbon blacks, clay, and blanc fixe; fillers and/or diluents, such as, for example, lithopone, barytes, asbestine, factice, and glue; softeners, such as, for example, paraffin wax, oils, fatty acids, and other synthetic or natural resins; and/or deodorants, such as terpene compounds.

Reclaimed rubber is also included among the materials which may be blended in rubber formulations with the hydrocarbon residual material herein described together with natural and/or synthetic rubber.

The hydrocarbon residual material described, and other ingredients, may be mixed or compounded with the natural rubber, reclaimed rubber, and/or synthetic rubber on calendering rolls, or they may be compounded by any other method known in the art. The rubber composition then may be vulcanized, if desired, by any of the methods employed for this purpose in the art.

Residual tar materials of the character described are particularly desirable plasticizers for rubber compositions which are to be employed as tire treads or for like severe use.

This residual tar material in addition to acting as a plasticizer improves the tear resistance of the rubber composition, a factor of great importance in synthetic rubber compositions for tire tread use such as GR-S tire tread formulations.

The gain in tear resistance is effected without harmful sacrifice of other properties.

As an example of the employment of residual tar polymer in a synthetic rubber tire tread formulation the following is given.

Example 3

The residual tar polymer employed was a 56.2° C. melting point polymer of residual tar of the character previously described, separated by the process of copending application 342,735 from the products of vapor phase cracking of a petroleum oil classifiable in class 7, by the previously mentioned Bureau of Mines classification method, and pyrolyzed under the conditions of uniform and homogeneous cracking and with an intensity of cracking within the range previously defined. The residual tar polymer had the following further characteristics — asphaltenes 75.2%, carbenes 0.4%, carboids 2.0%, asphaltic resins 4.2%, liquid o'ly constituents 18.5%, tolol pentane insoluble 77.5%.

The above residual tar polymer was employed in the following formulation:

| Ingredients | Parts by weight |
|---|---|
| GR-S Butadiene-styrene Copolymer Rubber | 500 |
| Lauric Acid | 5 |
| Santoflex B Reaction Product of Acetone and Para amino diphenyl | 6.25 |
| Zinc Oxide | 25 |
| Sulfur | 9.38 |
| Residual Tar polymer | 100 |
| Carbon black | 273.5 |
| Santocure Condensation Product of Mercaptobenzothiazole with Cyclohexylamine | 5.7 |

As an illustrative milling of this formulation the following is given.

The 500 parts by weight of GR-S butadiene-styrene copolymer rubber is refined by two tight passes through a 12 inch roll mill having rolls of 6 inch diameter. The rubber is then broken down by the use of a 0.12 inch mill opening for 10 minutes. The mill clearance is then reduced to 0.08 inch. During one minute 25 parts by weight of zinc oxide, 6.25 parts by weight of Santoflex B reaction product of acetone and para amino diphenyl and 5 parts by weight of lauric acid are added. Thereafter during 10 minutes 273.5 parts by weight of carbon black and 100 parts by weight of residual tar polymer are added. Thereafter 9.38 parts by weight of sulfur and 5.7 parts by weight of Santocure condensation product of mercaptobenzothiazole with cyclohexylamine are added and worked in. After 6 passes endwise through the mill the batch is sheeted off and allowed to rest for 24 hours. It is then sheeted out for vulcanization.

Example 4

As an example of the employment of a residual tar polymer of higher melting point in a synthetic rubber tire tread formulation the following is given.

The residual tar polymer was an 81.4° C. melting polymer of residual tar of the kind employed in the production of the residual tar polymer of Example 1, and had the following further characteristic: Asphaltenes 79.4%, carbenes 1.9%, carboids 5.1%, asphaltic resins 1.7%, liquid oily constituents 11.1%, tolol pentane insoluble 86.4%.

This residual tar polymer was employed in the following synthetic rubber formulation:

| Ingredients | Parts by weight |
|---|---|
| GR-S Butadiene-styrene Copolymer Rubber | 500 |
| Lauric Acid | 5 |
| Santoflex B Reaction Product of Acetone and Para amino diphenyl | 6.25 |
| Zinc Oxide | 25 |
| Sulfur | 9.38 |
| Residual Tar polymer | 100 |
| Carbon black | 273.5 |
| Santocure Condensation Product of Mercaptobenzothiazole with Cyclohexylamine | 4.1 |

The material was milled in the same manner as set forth in Example 1.

After vulcanization at various cure times the products of Examples 1 and 2 were submitted to test in comparison with a product of a formulation similar to those of Examples 1 and 2 except that "Paraflux" a well known synthetic rubber plasticizer was employed instead of residual tar polymer of the kind described, and except that Thionex A-10 tetramethyl-thiuram-monosulfide was employed as an accelerator instead of Santocure, a condensation product of mercaptobenzothiazole with cyclohexylamine.

The results of the tests are shown in Table 2.

Table 2

| | Formulation of Example 3 | Formulation of Example 4 | Paraflux Formulation |
|---|---|---|---|
| Modulus, lbs./sq. inch | 590 | 700 | 440-500 |
| Tensile, lbs./sq. inch | 2,070 | 2,180 | 1,930 |
| Elongation, percent | 790 | 745 | 720 |
| Aged-tensile, lbs. sq. inch | 2,320 | 2,095 | 1,715 |
| Aged Elongation, percent | 600 | 525 | 600 |
| Aged Elongation, percent over cure | 650 | 580 | 635 |
| Tear, lbs./0.1 inch of thickness | 38.2 | 37.8 | 26.9 |
| Hardness Shore Durometer units | 50 | 53 | 48 |
| Tortional Hysteresis | .527 | .475 | .431 |
| Heat buildup, °C. (Schopper) | 275 | 265 | 277 |
| Compression tear: | | | |
| 115 minute cure | 1.3 | .5 | 2.5 |
| 143 minute cure | 1.6 | 1.3 | 3.0 |
| 215 minute cure | 1.9 | 1.3 | 2.1 |
| Average | 1.6 | 1.0 | 2.5 |
| Spontaneous tear | 0 | 0 | 18 |

In the tests of Table 2, "tensile" strength and "elongation" were determined by the method of A. S. T. M. Standard D-412-41. They are averages of determinations on cures of 30, 50, 65 and 90 minutes at 290° F. Tensile strength being expressed as pounds per square inch of original cross section and elongation in per cent of original length. "Modulus" is the tensile pounds at 300% elongation, expressed in lbs. per sq. inch of original cross section.

"Aged-tensile" and "aged-elongation" were also averages of determinations on the same length cures as above after aging for 24 hours in air at 100° C. "Aged-elongation-overcure" is determined after the foregoing aging of the 90 minute cure.

"Tear" was determined by the method of A. S. T. M. D-624-41T, and also is an average of determinations on cures of 30, 50, 65 and 90 minutes at 290° F. It is expressed in pounds per 0.1 inch of thickness of the sample.

"Hardness" is an average of determinations made on slightly different cures as determined on the Shore durometer, and probably should be adjusted upward 3 units in the cases of Examples 1 and 2.

It is expressed in arbitrary units of the durometer.

"Torsional hysteresis" is an average of determinations made on the same cures as above by the method described in Rubber Chemistry and Technology, Jan. 1941, page 35, and is expressed in arbitrary units as described therein.

"Heat build up" is an average of determinations made on cures of 40, 60, 80 and 100 minutes at 290° F. and was measured by the rise in temperature in degrees centigrade of a ball sample above room temperature, when run for 800 revolutions in 4.4 minutes in a Schopper Standard Detrition machine with a total weight on the ball of approximately 58 pounds.

"Compression-tear" is an average of determinations on cures of 80, 100, and 150 minutes at 290° F. or their equivalent and is determined in the following manner.

Test samples are prepared as follows:

(1) The unvulcanized stock to be tested is refined on a laboratory mill as previously described.

(2) Semi-cylindrical test pieces are made, preferably by extrusion. The semi-cylinders are halves of cylinders two inches in diameter and one inch thick.

(3) Three cures of the test pieces are made at 80, 100 and 150 minutes at 290° F. or their equivalent.

(4) After vulcanization, the semi-cylinders of rubber are placed in a mitre box with their rectangular sides down to make the test cuts. The test cut is a straight cut at right angles to the cylindrical surface, and made in a radial plane which bisects the semicylinder. The cut is between 8 and 9 millimeters deep, and runs from one end of the semi-cylinder to the other. Care must be exercised to make the cut of the proper direction and depth. A cut which is not of proper direction and depth gives results which do not check. Cuts which are too shallow may not open properly in the center under pressure and do not give comparable results.

The test piece is then placed in a press between platens heated to 1350° C., with its rectangular side down and its cut surface up and allowed to stand for 1 minute at gage pressure to get up to temperature. A gage pressure of 2000 pounds per square inch is then applied for 10 minutes. While compressed the test piece should be observed by the operator to make certain it has opened properly. When the test cut opens properly it takes the form of a small hole in the compressed test piece.

The pressure is then released and the test piece removed, and the length of the cracks or "cut growth" developed by the compression at each end of the test piece measured in millimeters. The compression-tear value is the sum of the lengths of these cracks including any branches, divided by two, that is, it is the average "cut growth" per end.

The "spontaneous cracks" that is those cracks, if any, not originating in the test cut are also measured and recorded separately.

The above procedures are repeated twice, giving a total of 30 minutes of compression, unless the "cut growth" in the first or second period reaches the limiting boundaries of the test piece.

Average "cut growths" per end exceeding 10 millimeters are considered to indicate stock not fit for tire treads, as shown by correlating road tests.

The final measurements after the third 10 minute period taken as above give the accepted value for a given test piece, unless the test is terminated earlier.

Duplicate determinations (two half cylinder test pieces) are made on each of three cures, and the final compression-tear value as reported in the Table 2 is the average of six individual determinations.

The values developed in the compression tear test above described have correlated extremely well with the actual tear produced by road test in tire treads of synthetic rubber such as GR-S butadiene-styrene copolymer. This correlation with road tests has been much better than that of other test data employed to evaluate tire treads of synthetic rubber.

In the above Table 2, GR-S the butadiene-styrene copolymer rubber containing the residual tar polymer above described shows considerably better compression-tear values than the comparison "Mohawk" formulation containing Paraflux plasticizer, which recently led in performance all synthetic rubber formulations tested in Government road tests. The formulations of Examples 3 and 4 also showed better tear resistance by the method of A. S. T. M. Standard D-624-41-T. Hysteresis was slightly higher than in the Mohawk formulation.

Rubber compositions may also be formulated as follows:

EXAMPLE 5

| Component | Parts by weight |
|---|---|
| Natural rubber | 100 |
| Residual tar polymer | 20 |
| Magnesium oxide | 5 |
| Sulfur | 2.5 |
| Mercaptobenzothiazole | 0.8 |

EXAMPLE 6

| Component | Parts by weight |
|---|---|
| Pale crepe rubber | 100 |
| Zinc oxide | 50 |
| Sulfur | 2.5 |
| Residual tar polymer | 5 |
| Stearic acid | 0.3 |
| Mercaptobenzothiazole | 0.6 |

EXAMPLE 7

| Component | Parts by weight |
|---|---|
| Smoked sheet rubber | 100 |
| Carbon black | 40 |
| Zinc oxide | 6 |
| Stearic acid | 1 |
| Residual tar | 10 |
| Sulfur | 3 |
| Mercaptobenzothiazole | 0.7 |

EXAMPLE 8

| Component | Parts by weight |
|---|---|
| Neoprene Polychloroprene | 100 |
| Residual Tar Polymer | 5 |
| Light calcined magnesia | 10 |
| Carbon Black | 35 |
| Pine Tar | 3 |
| Phenyl-naphthylamine | 2 |
| Sulfur | 1 |
| Zinc oxide | 5 |

Example 9

| Component | Parts by weight |
| --- | --- |
| Butadiene-acrylic nitrile rubber | 100 |
| Residual Tar Polymer | 10 |
| Carbon black | 25 |
| Sulfur | 3 |
| Mercaptobenzothiazole | 0.75 |
| Light calcined magnesia | 10 |
| Phenyl- -naphthylamine | 2 |

Example 10

| Component | Parts by weight |
| --- | --- |
| Butadiene-isobutylene rubber | 100 |
| Residual Tar Polymer | 10 |
| Carbon Black | 15 |
| Sulfur | 1 |
| Mercaptobenzothiazole | 0.5 |
| Phenyl- -naphthylamine | 1 |
| Zinc oxide | 5 |

The foregoing compositions of Examples 5 to 10 may be sheeted out, shaped and vulcanized, such as by the application of a temperature of say 140° C. in a press for a period of say 45 minutes. Other procedures may, of course, be used if desired.

In the production of residual tar polymer from residual tar, if desired the hot residual tar separated by rapid distillation from the light oil and dead oil constituents of the tar as described in said copending application Serial No. 342,735 may be allowed to cool slowly, preferably though not necessarily after removal from the separating apparatus, and a part or all of the heat polymerization effected during such cooling of the tar.

The compositions of the claims may be in the vulcanized or unvulcanized state and may include admixtures of pigments, fillers, softeners, antioxidants, accelerators, etc.

While various procedures and formulations have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of $H_2O$ of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, and said residual tar having a content of heat polymerizable unsaturated material at least sufficient to cause an increase in the melting point of said residual tar of 20° C. when said residual tar is heated at 180° C. for 12 hours under conditions of total reflux.

2. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of $H_2O$ of the products of the vapor phase pyrolysis, during the production of combustible gas, at average temperatures above approximately 1300° F. of petroleum oil; said residual tar having a viscosity between 2000 SSU at 210° F. and 20,000 SSU at 210° F., and having a viscosity-distillable oil relationship within the area of viscosity-distillable oil relationships lying to the left of the curve having the formula $$\log y = 7.57 - 3.03 \log x$$

in which $y$ and $x$ are respectively rectangular coordinates of viscosity expressed in SSU at 210° F. and distillable oil expressed in percent by weight, and said residual tar having a content of heat polymerizable unsaturated material at least sufficient to cause an increase in the melting point of said residual tar of 20° C. when said residual tar is heated at 180° C. for 12 hours under conditions of total reflux.

3. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of $H_2O$ of the products of the vapor phase pyrolysis, during the production of combustible gas, at average temperatures above approximately 1300° F. of petroleum oil; said residual tar having a viscosity between 3000 SSU at 210° F. and 10,000 SSU at 210° F., and having a viscosity-distillable oil relationship within the area of viscosity-distillable oil relationships lying to the left of the curve having the formula $$\log y = 6.85 - 2.67 \log x$$

in which $y$ and $x$ are respectively rectangular coordinates of viscosity expressed in SSU at 210° F. and distillable oil expressed in percent by weight, and having a content of heat polymerizable unsaturated material at least sufficient to cause an increase in the melting point of said residual tar of 20° C. when said residual tar is heated at 180° C. for 12 hours under conditions of total reflux.

4. A composition comprising natural rubber and a heat polymer of a residual tar separated from tar-water emulsion produced during condensation in the presence of $H_2O$ of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, and said residual tar having a content of heat polymerizable unsaturated material at least sufficient to cause an increase in the melting point of said residual tar of 20° C. when said residual tar is heated at 180° C. for 12 hours under conditions of total reflux.

5. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula log $y=8.29-3.39 \log x$ in which $y$ and $x$ are respectively rectangular coordinates of viscosity expressed in SSU at 210° F. and distillable oil expressed in percent by weight, and said residual tar having a content of heat polymerizable unsaturated material at least sufficient to cause an increase in the melting point of said residual tar of 20° C. when said residual tar is heated at 180° C. for 12 hours under conditions of total reflux.

6. A composition comprising a rubber-like butadiene-acrylic nitrile copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, and said residual tar having a content of heat polymerizable unsaturated material at least sufficient to cause an increase in the melting point of said residual tar of 20° C. when said residual tar is heated at 180° C. for 12 hours under conditions of total reflux.

7. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 3000 SSU at 210° F. and 10,000 SSU at 210° F., and having a viscosity-distillable oil relationship within the area of viscosity-distillable oil relationships lying to the left of the curve having the formula log $y=6.05-2.26 \log x$ in which $y$ and $x$ are respectively rectangular coordinates of viscosity expressed in SSU at 210° F. and distillable oil expressed in percent by weight, and having a content of heat polymerizable unsaturated material at least sufficient to cause an increase in the melting point of said residual tar of 20° C. when said residual tar is heated at 180° C. for 12 hours under conditions of total reflux.

8. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 2000 SSU at 210° F. and 20,000 SSU at 210° F., and having a viscosity-distillable oil relationship within the area of viscosity-distillable oil relationships lying to the left of the curve having the formula $$\log y = 7.57 - 3.03 \log x$$

in which $y$ and $x$ are respectively rectangular coordinates of viscosity expressed in SSU at 210° F. and distillable oil expressed in percent by weight, and having a content of heat polymerizable unsaturated material at least sufficient to cause an increase in the melting point of said residual tar of 30° C. when said residual tar is heated at 180° C. for 12 hours under conditions of total reflux.

9. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 3000 SSU at 210° F. and 10,000 SSU at 210° F., and having a viscosity-distillable oil relationship within the area of viscosity-distillable oil relationships lying to the left of the curve having the formula $$\log y = 6.85 - 2.67 \log x$$

in which $y$ and $x$ are respectively rectangular coordinates of viscosity expressed in SSU at 210° F. and distillable oil expressed in percent by weight, and having a content of heat polymerizable unsaturated material at least sufficient to cause an increase in the melting point of said residual tar of 40° C. when said residual tar is heated at 180° C. for 12 hours under conditions of total reflux.

10. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 3000 SSU at 210° F. and 10,000 SSU at 210° F., and having a viscosity-distillable oil relationship within the area of viscosity-distillable oil relationships lying to the left of the curve having the formula $$\log y = 6.05 - 2.26 \log x$$

in which $y$ and $x$ are respectively rectangular coordinates of viscosity expressed in SSU at 210° F. and distillable oil expressed in percent by weight, and having a content of heat polymerizable unsaturated material at least sufficient to cause an increase in the melting point of said residual tar of 50° C. when said residual tar is heated at 180° C. for 12 hours under conditions of total reflux.

11. A composition comprising a material selected from the group consisting of natural rubber and rubber-like polymers of butadiene, isoprene, piperylene and 2-chloro butadiene; and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula log $y=8.29-3.39$ log $x$ in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated at 180° C. for 12 hours under conditions of total reflux, and the distillable oil content of said residual tar being characterized by having a refractivity intercept in the range of from 1.09 to 1.11 inclusive.

12. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated at 180° C. for 12 hours under conditions of total reflux, and the distillable oil content of said residual tar being characterized by having a refractivity intercept in the range of from 1.09 to 1.11 inclusive.

13. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated at 180° C. for 12 hours under conditions of total reflux, and the distillable oil content of said residual tar being characterized by having a density in the range from 1.00 to 1.02 inclusive and a refractive index 20/D in the range from 1.593 to 1.620 inclusive.

14. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of H₂O of the products of the vapor phase pyrolysis, during the production of combustible gas, at average temperatures above approximately 1300° F. of petroleum oil; said residual tar having a viscosity-distillable oil relationship within the area of viscosity-distillable oil relationships lying to the left of the curve having the formula log $y=8.29-3.39$ log $x$ in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated under conditions of total reflux for 12 hours at 180° C., and said residual tar being further characterized by a carboid content not exceeding 25% by weight of its pentane insoluble content.

15. A composition comprising a material selected from the group consisting of natural rubber and rubber-like polymers of butadiene, isoprene, piperylene and 2-chloro butadiene; and a heat polymer of a residual tar, separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated at 180° C. for 12 hours under conditions of total reflux, and said residual tar being further characterized by having a carboid content not exceeding 25% by weight of its pentane insoluble content and an asphaltene content of at least 70% by weight of its pentane insoluble content.

16. A composition comprising a rubber-like butadiene-styrene copolymer and a heat polymer of a residual tar separated from tar-water emulsion produced during condensation in the presence of H₂O of the products of the vapor phase pyrolysis, during the production of combustible gas, at average temperatures above approximately 1300° F. of petroleum oil; said residual tar having a viscosity between 1500 SSU at 210° F. and 30,000 SSU at 210° F., and having a viscosity-distillable oil relationship within the area of viscosity distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight, said residual tar having a content of heat polymerizable unsaturated material at least sufficient to cause an increase in the melting point of said residual tar of 20° C. when said residual tar is heated at 180° C. for 12 hours under conditions of total reflux, and said residual tar being further characterized by having a carboid content not exceeding 25% by weight of its pentane insoluble content and an asphaltene content of at least 70% by weight of its pentane insoluble content.

17. A composition comprising a material selected from the group consisting of natural rubber and rubber-like polymers of butadiene, isoprene, piperylene, and 2-chloro butadiene; and a material selected from the group consisting of residual tar, separated from tar-water emulsion produced during condensation in the presence of $H_2O$ of the products of the vapor phase pyrolysis, during the production of combustible gas, at average temperatures above approximately 1300° F. of petroleum oil and having a viscosity-distillable oil relationship within the area of viscosity-distillable oil relationships lying to the left of the curve having the formula $$\log y = 8.29 - 3.39 \log x$$

in which $y$ and $x$ are respectively rectangular coordinates of viscosity expressed in SSU at 210° F. and distillable oil expressed in percent by weight and having a content of heat polymerizable unsaturated material at least sufficient to cause an increase in the melting point of said residual tar of 20° C. when said residual tar is heated under conditions of total reflux for 12 hours at 180° C., and heat polymers of said residual tar.

P. EDWARD ROLLHAUS.

REFERENCES CITED

The following references are of record in the file of this patent:

UNITED STATES PATENTS

| Number | Name | Date |
|---|---|---|
| 1,611,436 | Hall | Dec. 21, 1926 |
| 1,884,240 | Rhodes et al. | Oct. 25, 1932 |
| 2,304,777 | Bulifant | Dec. 15, 1942 |
| 2,324,980 | Kilbourne | July 20, 1943 |